United States Patent
Tourapis et al.

(10) Patent No.: US 12,058,371 B2
(45) Date of Patent: *Aug. 6, 2024

(54) DIRECTED INTERPOLATION AND DATA POST-PROCESSING

(71) Applicant: DOLBY LABORATORIES LICENSING CORPORATION, San Francisco, CA (US)

(72) Inventors: Alexandros Tourapis, Los Gatos, CA (US); Athanasios Leontaris, Mountain View, CA (US); Peshala V. Pahalawatta, Burbank, CA (US); Kevin J. Stec, Los Angeles, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,954

(22) Filed: Sep. 14, 2023

(65) Prior Publication Data

US 2023/0421811 A1 Dec. 28, 2023

Related U.S. Application Data

(63) Continuation of application No. 18/175,122, filed on Feb. 27, 2023, now Pat. No. 11,792,429, which is a
(Continued)

(51) Int. Cl.
*H04N 19/597* (2014.01)
*H04N 7/01* (2006.01)
(Continued)

(52) U.S. Cl.
CPC ......... *H04N 19/597* (2014.11); *H04N 7/0102* (2013.01); *H04N 7/0117* (2013.01);
(Continued)

(58) Field of Classification Search
None
See application file for complete search history.

(56) References Cited

U.S. PATENT DOCUMENTS

| | | | |
|---|---|---|---|
| 4,027,333 | A | 5/1977 | Kaiser |
| 4,523,223 | A | 6/1985 | Lueder |

(Continued)

FOREIGN PATENT DOCUMENTS

| | | |
|---|---|---|
| CN | 1254433 | 5/2000 |
| CN | 2407534 | 11/2000 |

(Continued)

OTHER PUBLICATIONS

Anonymous—"Joint Draft 2.0 of Amendment to ITU-T Rec. H.264: Constrained Baseline Profile and Supplemental Enhancement Information" 30th JVT Meeting Jan. 29, 2009 through Feb. 2, 2009 (12 pgs.).

(Continued)

*Primary Examiner* — David N Werner

(57) ABSTRACT

An encoding device evaluates a plurality of processing and/or post-processing algorithms and/or methods to be applied to a video stream, and signals a selected method, algorithm, class or category of methods/algorithms either in an encoded bitstream or as side information related to the encoded bitstream. A decoding device or post-processor utilizes the signaled algorithm or selects an algorithm/method based on the signaled method or algorithm. The selection is based, for example, on availability of the algorithm/method at the decoder/post-processor and/or cost of implementation. The video stream may comprise, for example, downsampled multiplexed stereoscopic images and the selected algorithm may include any of upconversion and/or error correction techniques that contribute to a restoration of the downsampled images.

5 Claims, 11 Drawing Sheets

Related U.S. Application Data continuation of application No. 17/943,808, filed on Sep. 13, 2022, now Pat. No. 11,677,982, which is a continuation of application No. 16/831,647, filed on Mar. 26, 2020, now Pat. No. 11,477,480, which is a continuation of application No. 16/261,196, filed on Jan. 29, 2019, now Pat. No. 10,609,413, which is a continuation of application No. 15/678,982, filed on Aug. 16, 2017, now Pat. No. 10,194,172, which is a continuation of application No. 14/954,891, filed on Nov. 30, 2015, now abandoned, which is a continuation of application No. 13/255,308, filed as application No. PCT/US2010/031762 on Apr. 20, 2010, now Pat. No. 9,729,899.

(60) Provisional application No. 61/170,995, filed on Apr. 20, 2009.

(51) Int. Cl.

| | | |
|---|---|---|
| *H04N 13/161* | (2018.01) | |
| *H04N 13/172* | (2018.01) | |
| *H04N 13/178* | (2018.01) | |
| *H04N 13/218* | (2018.01) | |
| *H04N 19/154* | (2014.01) | |
| *H04N 19/17* | (2014.01) | |
| *H04N 19/172* | (2014.01) | |
| *H04N 19/176* | (2014.01) | |
| *H04N 19/423* | (2014.01) | |
| *H04N 19/44* | (2014.01) | |
| *H04N 19/587* | (2014.01) | |
| *H04N 19/70* | (2014.01) | |
| *H04N 19/80* | (2014.01) | |
| *H04N 19/85* | (2014.01) | |
| *H04N 19/86* | (2014.01) | |
| *H04N 19/895* | (2014.01) | |
| *H04N 21/434* | (2011.01) | |
| *H04N 13/10* | (2018.01) | |
| *H04N 19/40* | (2014.01) | |
| *H04N 19/89* | (2014.01) | |

(52) U.S. Cl.
CPC ......... *H04N 7/0135* (2013.01); *H04N 13/161* (2018.05); *H04N 13/172* (2018.05); *H04N 13/178* (2018.05); *H04N 13/218* (2018.05); *H04N 19/154* (2014.11); *H04N 19/17* (2014.11); *H04N 19/172* (2014.11); *H04N 19/176* (2014.11); *H04N 19/423* (2014.11); *H04N 19/44* (2014.11); *H04N 19/587* (2014.11); *H04N 19/70* (2014.11); *H04N 19/80* (2014.11); *H04N 19/85* (2014.11); *H04N 19/865* (2014.11); *H04N 19/895* (2014.11); *H04N 21/4347* (2013.01); *H04N 13/10* (2018.05); *H04N 19/40* (2014.11); *H04N 19/86* (2014.11); *H04N 19/89* (2014.11)

(56) References Cited

U.S. PATENT DOCUMENTS

| | | | |
|---|---|---|---|
| 4,985,767 A | 1/1991 | Haghiri | |
| 5,416,510 A | 5/1995 | Lipton | |
| 5,638,498 A | 6/1997 | Tyler | |
| 5,650,860 A | 7/1997 | Uz | |
| 5,742,346 A | 4/1998 | Sievers | |
| 5,818,535 A | 10/1998 | Asnis | |
| 5,915,067 A | 6/1999 | Nonomura | |
| 5,966,468 A | 10/1999 | Fujimoto | |
| 6,055,012 A | 4/2000 | Haskell | |
| 6,118,486 A | 9/2000 | Reitmeier | |
| 6,128,041 A | 10/2000 | Han | |
| 6,134,269 A | 10/2000 | Puri | |
| 6,144,701 A | 11/2000 | Chiang | |
| 6,249,610 B1 | 6/2001 | Matsumoto | |
| 6,295,089 B1 | 9/2001 | Hoang | |
| 6,332,043 B1 | 12/2001 | Ogata | |
| 6,466,624 B1 | 10/2002 | Fogg | |
| 6,661,463 B1 | 12/2003 | Geshwind | |
| 6,792,152 B1 | 9/2004 | Shibata et al. | |
| 6,804,403 B1 | 10/2004 | Wang | |
| 6,909,745 B1 | 6/2005 | Puri | |
| 7,162,080 B2 | 1/2007 | Chui | |
| 7,203,234 B1 | 4/2007 | Zeng | |
| 7,397,959 B1 | 7/2008 | Volkoff | |
| 7,421,127 B2 | 9/2008 | Bruls et al. | |
| 7,499,492 B1 | 3/2009 | Ameres | |
| 7,639,741 B1 | 12/2009 | Holt et al. | |
| 7,733,819 B2 | 6/2010 | Lee | |
| 7,881,552 B1 | 2/2011 | Gerber | |
| 8,218,082 B2 | 7/2012 | Chiu | |
| 8,363,724 B2 | 1/2013 | Su | |
| 8,373,744 B2 | 2/2013 | Akka | |
| 8,462,196 B2 | 6/2013 | Kim | |
| 8,487,982 B2 | 7/2013 | Lipton | |
| 8,879,857 B2 | 11/2014 | Raveendran | |
| 9,445,116 B2 | 9/2016 | Pandit | |
| 10,194,172 B2 | 1/2019 | Tourapis | |
| 11,477,480 B2* | 10/2022 | Tourapis | H04N 19/154 |
| 11,677,982 B2* | 6/2023 | Tourapis | H04N 19/17 348/43 |
| 11,792,428 B2 | 10/2023 | Tourapis | |
| 2001/0022887 A1 | 9/2001 | Lee | |
| 2002/0051491 A1 | 5/2002 | Challapali | |
| 2002/0085219 A1 | 7/2002 | Ramamoorthy | |
| 2002/0122510 A1 | 9/2002 | Evgeny | |
| 2003/0076423 A1 | 4/2003 | Dolgoff | |
| 2003/0156188 A1 | 8/2003 | Abrams | |
| 2003/0190079 A1 | 10/2003 | Penain | |
| 2003/0223499 A1 | 12/2003 | Routhier | |
| 2004/0008893 A1 | 1/2004 | Itoi | |
| 2004/0218269 A1 | 11/2004 | Divelbiss | |
| 2004/0223655 A1 | 11/2004 | Liao | |
| 2005/0018771 A1 | 1/2005 | Bourge | |
| 2005/0084006 A1 | 4/2005 | Lei | |
| 2005/0117637 A1 | 6/2005 | Routhier et al. | |
| 2005/0123207 A1 | 6/2005 | Marpe | |
| 2005/0175092 A1 | 8/2005 | Puri et al. | |
| 2005/0175093 A1 | 8/2005 | Haskell et al. | |
| 2005/0200757 A1 | 9/2005 | Pica | |
| 2006/0023782 A1 | 2/2006 | Cai | |
| 2006/0029136 A1 | 2/2006 | Cieplinski | |
| 2006/0083308 A1 | 4/2006 | Schwarz et al. | |
| 2006/0115167 A1 | 6/2006 | Itokawa | |
| 2006/0165169 A1 | 7/2006 | Ng | |
| 2006/0268991 A1 | 11/2006 | Segall | |
| 2006/0274204 A1* | 12/2006 | Kimura | H04N 21/4318 348/E5.076 |
| 2006/0282855 A1 | 12/2006 | Margulis | |
| 2006/0294125 A1 | 12/2006 | Deaven | |
| 2007/0110155 A1 | 5/2007 | Sung | |
| 2007/0140354 A1 | 6/2007 | Sun | |
| 2007/0147514 A1 | 6/2007 | Yamaguchi | |
| 2007/0160134 A1 | 7/2007 | Segall | |
| 2007/0222855 A1 | 9/2007 | Krijn | |
| 2008/0018506 A1 | 1/2008 | Raveendran | |
| 2008/0036854 A1 | 2/2008 | Elliott | |
| 2008/0089405 A1 | 4/2008 | Cho | |
| 2008/0095235 A1 | 4/2008 | Hsiang | |
| 2008/0170753 A1 | 7/2008 | Park | |
| 2008/0279282 A1 | 11/2008 | Kobayashi | |
| 2008/0285863 A1 | 11/2008 | Moon | |
| 2008/0317373 A1 | 12/2008 | Aoyama | |
| 2009/0002481 A1 | 1/2009 | Kim | |
| 2009/0003435 A1 | 1/2009 | Cho | |
| 2009/0103632 A1 | 4/2009 | Choi | |
| 2009/0116732 A1 | 5/2009 | Zhou | |
| 2009/0128620 A1 | 5/2009 | Lipton | |
| 2009/0142041 A1 | 6/2009 | Nagasawa | |
| 2009/0174704 A1 | 7/2009 | Sellers | |

(56) References Cited

U.S. PATENT DOCUMENTS

| | | |
|---|---|---|
| 2009/0290637 A1 | 11/2009 | Lai et al. |
| 2009/0290809 A1 | 11/2009 | Yamada |
| 2010/0053305 A1 | 3/2010 | Guillou |
| 2010/0061447 A1 | 3/2010 | Tu et al. |
| 2010/0111193 A1 | 5/2010 | Pandit |
| 2010/0207762 A1 | 8/2010 | Lee |
| 2010/0220796 A1 | 9/2010 | Yin et al. |
| 2010/0232767 A1 | 9/2010 | Sasaki |
| 2010/0260268 A1 | 10/2010 | Cowan |
| 2010/0309288 A1 | 12/2010 | Stettner |
| 2011/0085779 A1 | 4/2011 | Hattori |
| 2011/0135005 A1 | 6/2011 | Tourapis et al. |
| 2011/0164112 A1 | 7/2011 | Husak |
| 2011/0170792 A1 | 7/2011 | Tourapis |
| 2011/0280300 A1 | 11/2011 | Tourapis |
| 2011/0286530 A1 | 11/2011 | Tian |
| 2012/0087641 A1 | 4/2012 | Hattori |
| 2012/0288013 A1 | 11/2012 | Pahalawatta |
| 2012/0300843 A1 | 11/2012 | Horlander |
| 2014/0348232 A1 | 11/2014 | Leontaris |
| 2015/0181234 A1 | 6/2015 | Tourapis et al. |
| 2015/0237373 A1 | 8/2015 | Tourapis et al. |
| 2017/0324959 A1 | 11/2017 | Olivier |
| 2019/0132600 A1 | 5/2019 | Francois |
| 2022/0270209 A1* | 8/2022 | Mironica ............... G06N 3/045 |
| 2023/0127009 A1* | 4/2023 | Gilmutdinov ......... G06T 3/4015 |
| | | 382/156 |
| 2023/0421811 A1 | 12/2023 | Tourapis |
| 2023/0421812 A1* | 12/2023 | Tourapis .............. H04N 13/161 |
| 2023/0421813 A1* | 12/2023 | Tourapis .............. H04N 19/423 |

FOREIGN PATENT DOCUMENTS

| | | |
|---|---|---|
| CN | 1367611 | 9/2002 |
| CN | 1492687 | 4/2004 |
| CN | 1875635 | 12/2006 |
| CN | 201066898 | 5/2008 |
| CN | 101288303 | 10/2008 |
| DE | 19619598 | 11/1997 |
| EP | 0306448 | 3/1989 |
| EP | 0250534 | 5/1991 |
| EP | 1845729 | 10/2007 |
| JP | H04-183186 | 6/1992 |
| JP | 06-022290 | 1/1994 |
| JP | H09-084002 | 3/1997 |
| JP | H9-215009 | 8/1997 |
| JP | 11018111 | 1/1999 |
| JP | 2004-336104 | 11/2004 |
| WO | 03056843 | 7/2003 |
| WO | 2005120085 | 12/2005 |
| WO | 2006/137000 | 12/2006 |
| WO | 2008023917 | 2/2008 |
| WO | 2008/127676 | 10/2008 |
| WO | 2008/150111 | 12/2008 |
| WO | 2010/011557 | 1/2010 |
| WO | 2010/039417 | 4/2010 |
| WO | 2010/088420 | 8/2010 |

OTHER PUBLICATIONS

Bjontegaard, et al., "Adaptive Deblocking Filter", IEEE Transactions on Circuits and Systems for Video Technology, vol. 13, No. 7, Jul. 2003, pp. 614-619.

El-Etriby, et al., "Improvement of 3-D Reconstruction by Deformable Stereo Matching Using a Set of Linear Spatial Filters" GVIP Special Issue on Image Retrieval and Representation, Mar. 2006.

Hur, et al., "3D HDTV Relay Broadcast Experiments Using a Terrestrial and Satellite Network in Korea" pp. 1221-1224.

Hutchison, David, "Introducing DLP 3-D TV" pp. 1-5.

Hutchison, et al., "The Design and Implementation of a Stereoscopic Microdisplay Television" IEEE Transactions on Consumer Electronics, IEEE Service Center, New York, NY, vol. 54, No. 2, May 1, 2008, pp. 254-261.

ITU-T Telecommunication Standardization Sector of ITU, "Advanced Video Coding for Generic Audiovisual Services" H.264, May 2003.

ITU-T, H.264 "Advanced Video Coding for Generic Audiovisual Services" Series H: Audiovisual and Multimedia Systems Infrastructure of Audiovisual services—Coding of Moving Video, Mar. 2009.

Kim, et al., "New Coding Tools for Illumination and Focus Mismatch Compensation in Multiview Video Coding" IEEE Transactions on Circuits and Systems for Video Technology, vol. 17, No. 11, Nov. 2007, pp. 1519-1535.

Liu, et al., "H.264/SVC Error Resilience Strategies for 3G Video Service" Image Analysis and Signal Processing, 2009, International Conference on IEEE, Piscataway, NJ, USA, Apr. 11, 2009, pp. 207-211.

M Tagliasacchi, G. Prandi, & S. Tubaro, "Symmetric Distributed Coding of Stereo Video Sequences", 2 2007 IEEE Int'l Conf. on Image Processing (ICIP 2007) 29-32 (2007).

McCormick, et al., "Implementation of Stereoscopic and Dualview Images on a Micro Display High Definition Television" 3-DTV-Con 2008, Istanbul, Turkey, May 208, pp. 33-36.

SMPTE 421M-2006 "VC-1 Compressed Video Bitstream Format and Decoding Process" Apr. 2006.

Steffen Wittmann et al: "Transmission of Post-Filter Hints for Video Coding Schemes" Image Processing , 2007. ICIP 2007, IEEE International Conference on, IEEE, PI, Sep. 1, 2007 (Sep. 1, 2007), pp. 1-81.

Suhring, JVT reference software version JM14.2.

Sullivan, G., et al., "Meeting Report of the 29th JVT Meeting", Joint Video Team of ISO/IEC JTC1/SC29/WG11 and ITU-T, etc. Oct. 13-17, 2008 in Busan, Korea. (26 pgs.).

Tagliasacchi, M. et al."Symmetric Distributed Coding of Stereo Video Sequences" IEEE International Conference on Image Processing vol. 2, pp. II-29-II-32, Sep. 16, 2007-Oct. 19, 2007.

Tamhankar, et al., "An Overview of H264/MPEG-4 part 10" Video/Image Processing and Multimedia Communications, 2003. 4th Eurasian P Conferenced Focused on Jul. 2-5, 2003, Piscataway, NJ, vol. 1, pp. 1-51.

Tourapis A M et al: "Format Extensions to the Spatiall Interleaved Pictures SEI message" 30. JVT Meeting; Jan. 29, 2009-Feb. 2, 2009; Geneva, ; (Joint Video Team of ISO/IEC JTC1/SC29/WG11 and ITU-T SG.16), , Jan. 31, 2009 (Jan. 31, 2009).

Tourapis, et al., "SEI Message for Checkerboard Multiplexed Video Data" JVT of ISO/IEC MPEG & ITU-T VCEG JVT 2010, Oct. 12, 2008, pp. 1-5.

Tseng, et al., "Compatible Video Coding of Stereoscopic Sequences Using MPEG-2's Scalability and Interlaced Structure" 1994.

Vetro, Anthony, "MVC Profile/Level Definitions of Stereo" JVT Meeting of ISO/IEC MPEG & ITU-T VCEG, 28th meeting Jul. 20-25, 2008.

Wang, et al., "A new motion compensation design for H.264/AVC decoder" 2005 IEEE Int'l Symposium on Circuits & Sys., May 2005, 4558-4561.

Wittmann, et al., "Transmission of Post-Filter Hints for Video Coding Schemes" Image Processing, 2007, IEEE International Conference on IEEE, Sep. 1, 2007, pp. 1-81.

Wittmann, S. et al."SEI Message on Post-Filter Hints for High Fidelity" JVT of ISO/IEC MPEG & ITU-T VCEG, 20th Meeting: Klagenfurt, Austria Jul. 17-21, 2006.

Yunpeng Liu Te Al: "H.264/SVC error resilience strategies for 3G video service" Image Analysis and Signal Processing, 2009. IASP 2009. International Conference on, IEEE, Piscataway, NJ, USA, Apr. 11, 2009 (Apr. 11, 2009), pp. 207-211.

* cited by examiner

DIRECTED INTERPOLATION AND DATA POST-PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is a continuation of U.S. patent application Ser. No. 18/175,122, filed on Feb. 27, 2023, which is a continuation of U.S. patent application Ser. No. 17/943,808, filed on Sep. 13, 2022 (now U.S. Pat. No. 11,677,985), which is a continuation of U.S. patent application Ser. No. 16/831,647, filed on Mar. 26, 2020 (now U.S. Pat. No. 11,477,480), which is a continuation of U.S. patent application Ser. No. 16/261,196, filed on Jan. 29, 2019 (now U.S. Pat. No. 10,609,413), which is a continuation of U.S. patent application Ser. No. 15/678,982, filed on Aug. 16, 2017, (now U.S. Pat. No. 10,194,172), which is a continuation of U.S. patent application Ser. No. 14/954,891, filed on Nov. 30, 2015 (now abandoned), which is a continuation of U.S. patent application Ser. No. 13/255,308, filed on Sep. 8, 2011, (now U.S. Pat. No. 9,729,899), which is the U.S. National Stage Entry for International Patent Application No. PCT/US2010/031762, filed on Apr. 20, 2010, which claims the benefit of priority to U.S. Provisional Application No. 61/170,995, filed Apr. 20, 2009, all of which are hereby incorporated by reference in their entirety.

BACKGROUND OF THE INVENTION

Field of Invention

The present invention relates to interpolation and post processing.

Discussion of Background

In many environments and applications, resolution of a signal may have to be compromised. This could be done, for example, to reduce the bandwidth required to represent the signal, reduce decoding complexity, fit the characteristics of a certain display device etc. The resolution of the signal could also be specified in a variety of domains/dimensions. In the case of a video signal, such could include, spatial (i.e., horizontal and vertical) resolution, temporal resolution, bit-depth, and even stereo information among others. In many cases, resolution in one dimension can be compromised in favor of another, e.g. in the case of interlace video signals, spatial resolution is sacrificed in favor of temporal resolution. For 3D applications, one compromise is to downsample spatially, using a variety of arrangements, and then multiplex the available stereo views. Downsampling can be horizontal, vertical, or even quincunx based, while the data can be packed or interleaved together, i.e. using checkerboard multiplexing.

SUMMARY OF THE INVENTION

The present inventors have realized that current methods for reconstruction of downscaled or otherwise compromised video and other data can be severely limited in performance, or constrained in terms of complexity, given that the conversion process has little or no information about the original nature and characteristics of the content.

In various embodiments, the present invention provides for the reconstruction of a downscaled or otherwise compromised video or other data back to it's original, or even a higher/different resolution or format. For example, a 720p (1280×720) resolution video may be (or may need to be) upconverted to a 1080p (1920×1080) resolution for display on a higher resolution display. Similarly, a 3D signal comprising of two quincunx sampled views multiplexed in a checkerboard arrangement or a 3D signal comprising of two horizontally or quincunx sampled views packed in a side by side arrangements may have to be upconverted to two full resolution 3D views or a different sampling arrangement such as line by line.

FIG. 9 is an illustration of an exemplary quincunx sampling technique, where, for example, a full resolution image 905 (e.g., a left view of a stereographic image pair) is operated on by a filter/function/conversion f(x) 920 and then quincunx sampled by sampler 930. The result is a sample pattern that is, for example, as illustrated at 940. The sample pattern (of pixel data) may then be multiplexed with another quincunx sampled image (e.g., right view of the stereoscopic pair) or possibly another view or even an unrelated image, and then encoded. The process can also be applied to images using a different sampling and packing method, such as horizontal sampling with side by side packing, or vertical sampling with line by line or over under packing.

The conversion process can be done using a variety of algorithms, including any one or more of, for example, separable or non-separable filters, edge adaptive interpolation methods etc, which, in various embodiments, may also require the analysis and characterization of the signal.

FIG. 10 is an illustration of an interpolator for quincunx sampled data according to an embodiment of the present invention. The process is similar to other sampling and packing methods. As illustrated in FIG. 10, a bitstream 1005 is provided to a decoder 1050 that decodes a sampled image 1080 (quincunx sampled image in this example), which is then applied to each of a series of filter operations 1085. The filter operations 1085 may include any temporal, spatial or other upconversion process or any other processes described herein for any type of up-conversion, error correction, color correction, or general improvement of the sampled image. The filter operation to be utilized for any particular pixel or region is, for example, specified by metadata extracted by metadata extractor 1070 from the bitstream 1005. The result is, for example, a full resolution version 1090 of the image.

In the case of stereographic image pairs to be projected, the directed filter operations may include color correction such that the colors in corresponding portions of the left and right images are consistent with the director's intent. In such an embodiment/application, the color correction is particularly important in projection systems using different color light sources or filters so that both the left and right image colors match as intended.

The present invention includes methods which enable improved conversion performance and/or control conversion complexity by signaling to a device, e.g. a decoder, a display, or other system, which conversion method, or methods, should be used. The methods may also be used to alter or control the behavior of the decoder in certain scenarios or environments such as in the case of controlling decoder complexity by altering or even disabling certain tools that were originally mandated by the decoding process, or, in the case of error concealment, where the information provided can now consider a more "informed" process for correcting errors in the signal. The signaling may be, for example, at the sequence, group of pictures, picture, or region level. A group of pictures can be of a fixed size or can be arbitrary. Similarly a region can be of fixed shape and size down to even a pixel, or could also be arbitrary. The invention is not restricted in only the methods for signaling said parameters but also on how to derive the "best", given a predefined criterion, parameters.

The present invention may be embodied as a method comprising the step of receiving a signal indicative of a processing technique to be utilized on a data stream.

The processing technique may comprise, for example any one or more of a resolution conversion, controlling a complexity of processing, artifact reduction, error correction, error concealment, scaling, interpolation, an alteration of existing processing tools, and an enabling or disabling of at least one tool. The resolution conversion may comprise at least one of spatial resolution conversion and temporal resolution conversion. Scaling may comprise at least one of de-interlacing, temporal interpolation, and spatial interpolation. Error concealment may comprise a prediction of motion of a region in error. The signal may be further indicative of at least one of a spatial and temporal extent to which the processing technique is to be applied.

In one embodiment, the data stream is a video data stream and the extent comprise whether the processing technique is applied to at least one of all of the video, portions of the video, pictures of the video, and regions within the video. The pictures of the video may comprise, for example, any of a frame of the video and a field of the video.

In one embodiment, the data stream comprises a video comprising at least two different views and the signal further indicates that the processing technique is performed for at least one region within at least one frame of the video. The different views may comprise, for example, at least one of stereographic views, two different images, a 2D image and depth information, multiple views of a 2D scene having different characteristics such as resolution, bitdepth, or color information, and multiple views of a 3D scene. The at least two different views may also be compressed and multiplexed within the data stream in a standardized motion picture format capable of single view video streams. Compression of the views may comprise at least one of a sampling, filtering, and decimation of the views. The compression of the views may also comprise at least one of horizontal, vertical filtering, and quincunx sampling. The compression of the views may also comprise both filtering and sampling. And sampling may, for example, comprise at least one of horizontal, vertical, quincunx, formula based, pattern based, and arbitrary sampling. Multiplexing may be done, for example, in at least one of a checkerboard format, a quadrant based format, a column format, a row format, a side-by-side format, an over-under format, a format based on a pattern, and an alternative format.

In one embodiment, the signal is configured to identify at least one of at least part of a decoding process and at least part of a post-decoding process to be applied to a region of an image or video scene having characteristics on which the identified process operates efficiently. The characteristics may comprise at least one of texture, contour, edge, contrast, dynamic range, and brightness of the region.

In one embodiment, the signal is received from at least one of the data stream and side information related to the data stream. In another embodiment, the signaling may comprise a processing technique to be applied to at least one of a sequence, group of pictures (GOP), and region of one of a fixed, arbitrary, or varying size. The method may further comprise the step of selecting at least one processing technique based on the signaled processing technique and applying the selected processing technique to at least one of the sequence, GOP, and region. The step of selecting may be performed, for example, by a decoder configured to decode the data stream by applying the selected processing technique to at least one of the sequence, group of pictures (GOP), and region. The step of selecting may also comprise selecting a processing technique in a different category of processing techniques than the signaled processing technique but nearest to the signaled processing technique.

In one embodiment, the processing technique comprises a series of processing techniques. The series of processing techniques may comprise, for example, at least one of an interpolation process, filtering, and a de-blocking process.

In one embodiment, the signaling may comprise signaling a family of processing techniques, and the method may further comprise the steps of selecting at least one processing technique from the signaled family and applying the selected technique(s) to at least one of a sequence, group of pictures (GOP), and a region of one of a fixed, arbitrary, or varying size.

In one embodiment, the processing technique was selected via a pre-processing step prior to receiving the data stream. The pre-processing may comprise, for example, studio work performed prior to mastering the data stream for media storage or broadcast. The pre-processing may comprise an iterative performance of a set of potential processing techniques on a like data stream and an embedding of an identifier of a selected processing technique in at least one of the data stream and side information related to the data stream. The pre-processing may also be performed on-the-fly during a pre-processor playback of a video captured by the data stream prior to, or contemporaneously with, encoding and then storage on a medium or transmission through any number of channels for decoding and playback by an end user.

The selected processing technique may also require additional information generated by performing additional analysis and/or processing during decoding and playback of the data stream at the decoder. Such analysis and/or processing may occur, for example, during an on-the-fly decoding and playback of the encoded video for viewing by an end user viewer. Such analysis and/or processing may comprise, for example, a refinement of analysis and/or processing performed at the encoder.

The selected processing technique may comprise, for example, at least one of a least cost processing technique, a highest performance processing technique, and a combination or tradeoff between cost and performance. Cost may comprise, for example, at least one of complexity, area, power, and price. Performance may comprise, for example, at least one of quality and speed.

In one embodiment, additional analysis comprises, for example, an additional "assist/second" post-processing may also happen on the decoder device given the information provided.

In another embodiment, the data stream comprises an encoded video data stream and the signaled processing technique was selected to enhance one of a decoding and a post-process of decoding for at least one of a picture, Group Of Pictures (GOP), and region of the video data stream. The processing technique was selected, for example, at least one of before, during, or after an encoding of the video data stream. The data stream may comprise, for example, a trans-coded encoded video stream, and the processing technique may have been selected at least one of before, during, or after an encoding of the video data stream. The processing technique may comprise, for example, parameters to be used in conjunction with the processing technique on a region of the video data stream, and the method may further comprise receiving a change in parameters for at least one of sub-regions of the region and a different region.

The invention may also be embodied as a method, comprising the steps of, selecting a mechanism for improving at least a portion of a video to be decoded from an encoded video wherein the selected mechanism is configured to direct at least one of a decoding of the encoded video and a post-process applied to the video after decoding, and packaging at least one of the selected mechanism and an identifier of the selected mechanism as a directive signal into at least one of the encoded video and side information of the encoded video. The selected mechanism may comprise at least one of a process and parameters of a process. The portion of the video may comprise at least one of a region and sub-region of the video.

In one embodiment, the portion of the video comprises at least one of an image of the video, a sequence of images of the video, a region of an image of the video, a dynamic region across frames of the video, and any sub-region(s) of the video. Alternatively, the portion of the video comprises a region or sub-region of the video comprising a block. In another alternative, the portion of the video comprises a region or sub-region of the video comprising multiple blocks. The blocks may be, for example, non-contiguous. The blocks may also comprise at least part of a checkerboard pattern.

In one embodiment, the portion of the video comprises a geometric arrangement of video data samples across multiple frames of the video. The geometric arrangement may vary in at least one of size and shape between frames of the video.

In one embodiment, the portion of the video comprises an irregular arrangement of video data samples. In another embodiment, the portion of the video comprises co-located samples of a stereoscopic scene of the video. In yet another embodiment, the portion of the video comprises a cuboid comprising M×K×N where M is width, K is height, and N is a number of temporal samples. In yet another embodiment, the portion of the video comprises one of a segment and an object tracked across multiple frames. In still yet another embodiment, the portion of the video is determined by at least one of user input, segmentation, object tracking, scene cut detection, edge detection, watershed, haursdorff method, K-means, motion detection, motion estimation, motion analysis, and quality evaluation. In still yet another embodiment, the method may further comprise the step of repeating the steps of selecting and packaging for a $2^{nd}$ portion of the video. The portion of the video may comprise a regularly shaped region and the $2^{nd}$ portion of the video may comprise an irregularly shaped region. In one embodiment, the portion of the video and the $2^{nd}$ portion of the video overlap. The selected mechanism may comprise an instruction of how to average processing performed by the mechanisms in the video overlap. The selected mechanism may also comprise an instruction of how to sequentially initiate the mechanisms in the video overlap.

In one alternative, the portions of the video are predefined and the packaging contains no information identifying the portions. In another alternative, the portions of the video are defined using at least one of a cuboid description, a vector based description, and a raster based description. The portion of the video may be, for example, identified with data encoded using an image format.

In another embodiment, the portion of the video is identified with data encoded using a format comprising at least one of CGM, SVG, EPS, WMF, TIFF, BMP, JPEG, JPEG-2000, MPEG-2, and H.264, and MPEG4-AVC. In another embodiment, the portion of the video comprises a region identified in a process map. In another embodiment, the portion of the video comprises a region mapped in at least one of an image or graphics format. In another embodiment, the invention includes packaging sequence instructions along with the directive signal. In another embodiment, the directive signal comprises sequencing that indicates a preferred order of various processes to be performed. In another embodiment, the directive signal may comprise a sequencing of spatial up-sampling, temporal up-sampling, and de-blocking to be performed at least in part by the selected mechanism. In another embodiment, the portion of the video comprises a region divided into a series of sub-regions wherein the selected mechanism comprises a Pt parameter corresponding to a first of the sub-regions and a $2^{nd}$ parameter corresponding to a second of the sub-regions. In another embodiment, the mechanism is selected based at least in part on a complexity of the mechanism. The selected mechanism may have, for example, a lowest complexity for a given quality threshold.

The present invention may also be embodied as a post-processing device, comprising a video input configured to receive a decoded video stream, an instruction mechanism configured to one of accept a directive instruction from a side information channel of the video stream and identify a directive instruction from the decoded video stream, a post-processor configured to post-process the decoded video stream based on the directive instruction, and a video output configured to output the post-processed video stream. The post-processing device may be integrated, for example, into at least one of a display, a set-top box, and a media player. The directive instruction may comprise, for example, an identification of at least one region in the video and at least one processing method to be applied to the region. The region may comprise, for example, sub-regions and the directive instruction may comprise different parameters to be applied to the processing method for processing each sub-region. The directive signal may also identify regions of different texture qualities and processing methods specifically for each texture quality.

In one embodiment, the directive signal comprises a filter identification selected after testing a plurality of filters on the decoded video stream. The filter identification may comprise an identification of an entire category of filters. The post-processor may also be configured to select a filter from the category of filters and utilize the selected filter to post-process the decoded video stream. The post-processor is further configured to select a filter having properties closest to properties of the category of filters and utilize the selected filter as at least part of the post-process.

In one embodiment, the post-processor is further configured to select a filter known to have properties that are at least one of close to or better than the filter identified by the filter identification. In another embodiment, the filter identification is selected based on at least one of distortion and complexity. The distortion may be evaluated in a number of ways, including via at least one of SAD, SSE, subjective evaluation, blockiness, variance, frequency characteristics, image/texture sharpness, edge quality, and artifacts either spatially or temporally.

In one embodiment, testing is performed in an open-loop type testing device, and in another embodiment, testing is performed in a closed-loop type testing device. The testing may be performed, for example, for a plurality of regions of the video. The plurality of regions may comprise, for example, temporal regions of the video. The plurality of temporal regions comprises regions of changing shape and size.

In one embodiment, the regions of the video are determined by at least one of segmentation, object tracking, scene cut detection, edge detection, watershed, haursdorff method, K-means, motion detection, motion estimation, and motion analysis. The regions of the video may be identified using at least one of CGM, SVG, EPS, WMF, TIFF, BMP, JPEG, JPEG-2000, MPEG-2, and H.264, and MPEG4-AVC.

The present invention may also be embodied as a system, comprising, an encoder configured to select at least one of a processing technique, a category of processing techniques, and a series of processing techniques to be utilized in a decoder and encode the selected techniques or an identifier of the selected technique(s) in at least one of an encoded video stream and side information related to the encoded video stream, and a decoder configured to receive the encoded video stream and decode the video stream using at least one of the selected technique(s). The selected technique(s) are solely identified from the encoded video stream. The selected technique(s) may be identified, for example, by the decoder from at least one of the related side information and the encoded video stream. The techniques may be selected based on at least one of quality, complexity, and cost. The decoder may utilize the selected processing technique to select another processing technique.

In one embodiment, the decoder maintains an inventory of processing techniques and selects a processing technique or technique(s) from the inventory most closely matching the technique(s) selected by the encoder. In one embodiment, the decoder selected technique is selected based at least on one of complexity, cost, and quality. The decoder selected technique may also be selected based at least in part on complexity in light of an amount of processing power available in the decoder.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
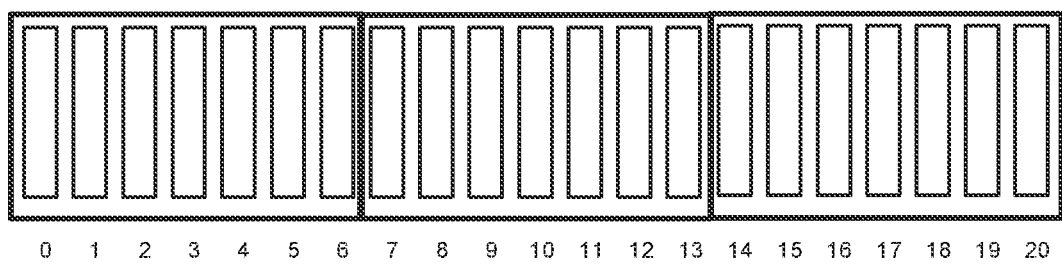
FIG. 1A is an illustration of fixed size temporal regions for metadata signaling according to an embodiment of the present invention.
Figure 1B:
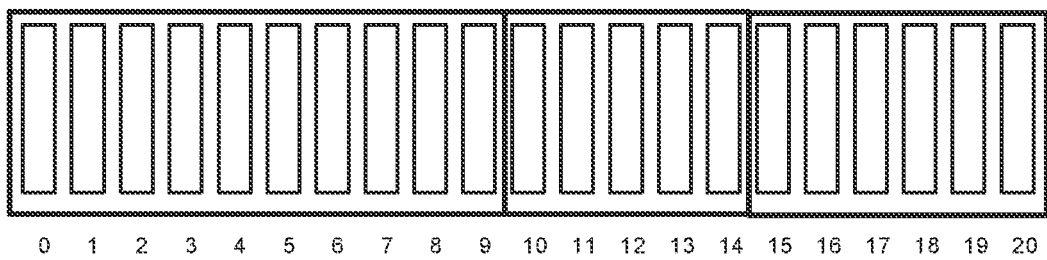
FIG. 1B is an illustration of adaptively sized temporal regions for metadata signaling according to an embodiment of the present invention.

The present inventors have observed that the performance and behavior of an algorithm may be quite different depending on the characteristics of the region of an image, video scene, or other data that the algorithm is applied. In particular, in the case of a video, for a region $R_0$ with low texture characteristics algorithm $A_0$ may behave better and result in better image quality for, e.g., scaling than algorithm $A_1$, while $A_1$ may behave better and result in better image quality for a different region $R_1$. Although a decoder may try to determine which algorithm may perform better given the characteristics of the region or even given the characteristics of the converted regions given algorithms $A_0$ and $A_1$, this process can be too complex and too time consuming to perform. Furthermore, given the fact that the decoder only has limited information about the image/video, performance is always bounded by the available information. This can considerably limit the performance of such a scheme.

In various embodiments, the present invention assists the decoder or post-processor by providing additional information which can dictate which algorithm, algorithms, or algorithm groups/classes it should use to process each different region. This is done by analyzing and evaluating each algorithm and its performance or/and characteristics at before (e.g. using a pre-processor), during or after the encoding process, rating the behavior of each algorithm given the application, and then selecting and signaling the appropriate algorithm, and any related parameters, for each region.

Signaling can be done within the bitstream (or data stream) itself (e.g., including signals or metadata in the bitstream) or could be signaled as side information (e.g. as a metadata file or stream). At the decoder, the recommended processing information about each region can be decoded and the appropriate algorithm or algorithms selected, contained in, or identified in the signals or metadata is used for performing the necessary operation or operations that may be predetermined or also identified in the signals or metadata.

Note that in the present invention, the decoder can be configured to maintain control over the algorithms utilized. For example, a decoder or post-processor may not always be obligated to use the selected or identified algorithm or class of algorithms, and may choose to disregard or select similar algorithms depending on circumstances (such as, for example, availability of certain algorithms and/or cost to implement). Furthermore, the decoder or post-processor may select to partially "ignore" the recommended algorithm, e.g. $A_0$, and instead use a different algorithm, e.g. $A_1$. $A_1$ may have similar properties with $A_0$, but might be less complicated, or may be known to have better performance. It is also possible that maybe $A_0$ is not available or not known, in which case the decoder or post-processor may wish to use a default algorithm, e.g. $A_D$, which is predefined by the system.

Region Signaling

At the pre-processor and/or the encoder stage each algorithm or each algorithm class is preferably evaluated before signaling. Evaluation can be done at a region level, where a region can be any portion of the bitstream. For example, in a video bitstream, the region may be the entire sequence or image, a sub-sequence/video scene, a stereo frame pair or a single frame/view, including sub-sampled views, or sub-regions in an image. Sub-regions in an image could have a regular (e.g. triangular, rectangular etc) or irregular/random shape, can be of any size (e.g. 8×8, 32×32, 4×64 etc), and can even extend temporally (e.g. an object tracked in time) or in space (e.g. an object in 3D space).

Regions could also be considered using sub-sampling, especially in the case of sub-sampled and multiplexed data as is the scenario of quincunx sampled and checkerboard multiplexed video data for 3D stereo delivery. Regions could also be predefined, e.g. by a user. For example, an entire sequence can be identified as a single region, or a region could specify a collection of N subsequent frames such as in the case of a fixed Group of Pictures (GOP) of size N.

Figures 2A, 2B, 2C:
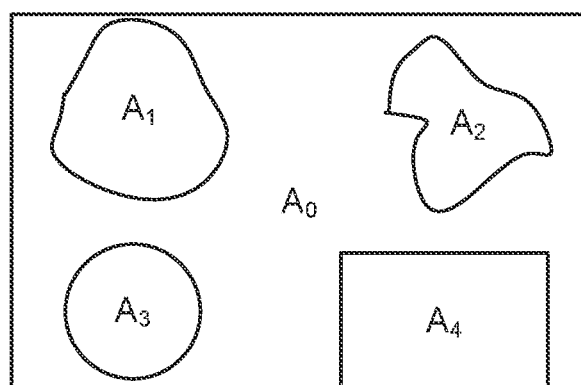
FIG. 2A is an illustration of equally sized regions according to an embodiment of the present invention.
FIG. 2B is an illustration of adaptively defined regions according to an embodiment of the present invention.
FIG. 2C is an illustration of sub-regions within various regions according to an embodiment of the present invention.

Regions may comprise, for example, a spatial regional segmentation used for processing to determine signaling for that segment. As shown in FIG. 2A, M×K rectangular regions of equal size (width/M)×(height/K) where width is the width and height is the height of the frame respectively can also be used. A user may even specify that all individual pixels, or even all individual samples (e.g. separating luma and chroma samples) that correspond to a region.

Other combinations may also be utilized, including, for example, grouping together co-located samples in a stereo pair, a cuboid of size M×K×N where now N corresponds to temporal samples, etc. Regions may also be adaptively selected and defined and basically be of an arbitrary shape. As shown in FIG. 2B, adaptively defined regions $A_0$-$A_4$ are illustrated. In various embodiments, regions can be selected using one or more of a variety of algorithms such as scene cut detection, image/video segmentation, object tracking, etc.

Algorithms for segmentation may include techniques using edge detection, watershed methods, the haursdorff distance, K-means, and could also consider motion detection/estimation and analysis. Motion estimation may be done using a variety of algorithms and models including affine, parabolic, translational among others, and could be block or region based, done in the spatial or frequency domain (e.g. using phase correlation) etc.

The present invention does not restrict the application of other algorithms for the determination of such regions. Regions may also be classified given their illumination and chroma characteristics, texture, or be based on semantic information and user interaction. A combination of arbitrary shaped and regular shaped regions could also be used. For example, a region could be of fixed temporal length N but its spatial shape may change for every frame.

As illustrated in FIG. 2C, a region may also be further separated, in sub-regions. In this scenario, a system may specify first a set of primary regions (e.g., similar to the concept of a Macroblock in a video coding system), to which a particular processing method needs to be applied, while the same region can be, optionally, further separated into smaller sub-regions for which different parameters for the processing method can be used (e.g. the same algorithm but with a different strength filter or different thresholds). Regions may also overlap, in which case multiple algorithms can be applied to overlapping areas which can then be combined. Combining could be done after processing using simple averaging, or could be based on a weighted averaging method that could be based on the distance of the pixel from the center of each region, the characteristics and expected performance of the algorithm and the characteristics of the overlapping pixels or regions. In one embodiment, different algorithms are applied in a specified order to each region including the overlapped area.

If the regions are predefined, there is no need to encode any information about their characteristics (e.g. shape, size, overlap etc). However, if these are not predefined, then it is required that such information is encoded and is available to the decoder. Encoding is not necessarily complex, especially for regularly shaped regions and can include information such as, for the case of a cuboid number of horizontal (M), vertical (K), and temporal (N) segments, or be more complicated such as using a vector or raster based description of the regions. For example, all regions could be described using the computer graphics metafile file format (CGM), the Scalable Vector Graphics (SVG) format, Encapsulated Postscript (EPS) or Windows Metafile (WMF), or other vector graphics formats. Similarly, for a raster based description, we could use TIFF or BMP, JPEG, JPEG-2000, or even video codec representations using MPEG-2 or H.264/MPEG-4 AVC. In these scenarios prediction, both spatial and temporal, for representing the regions can be used. Both lossless and lossy representations could be considered where in the lossy case a different algorithm may inadvertently be used. However, if this process is done carefully and is known in the encoder, then this would not result in any issues especially if any processing is performed iteratively. In both vector and raster representations, the representation can be kept in a high resolution or could be subsampled down to 1×1 sample.

In various embodiments an image can be characterized and represented by multiple region representations/maps, which may or may not be related, with each representation relating to a different post/interpolation process that needs to be applied onto the image. For example, one region representation can specify spatial up-sampling, a second region representation can specify temporal up-sampling/frame rate conversion, while a third one can specify de-blocking or de-noising. The sequence of which process should be performed first may depend on the order of the representations as they are found in the bitstream, or could be described within the bitstream itself with additional syntax. For example, in the above scenario we can signal to perform first the spatial up-sampling followed by temporal up-sampling and then de-blocking, or we can signal that de-blocking should be performed first, followed by spatial up-sampling, and then temporal up-sampling.

Analysis and Filter Selection

The present invention may be configured to signal a variety of post-processing methods including the preferred/recommended spatial or temporal up-scaling or downscaling method and its parameters, de-blocking, and de-noising among others, or even suggested (non-normative) simplifications in the decoding process and recommended methods for performing error concealment. The method and parameters to be signaled for a region can be selected in a variety of ways. In particular, the parameters could be fixed (e.g. the same method $M_0$ for the entire sequence or for regions $A_0$ in all frames, while method $M_1$ is used for regions $A_1$), changed periodically (e.g. every N frames method $M_0$ in the above example is switched to method $M_{0,N}$), or could be adaptive given certain properties of the signal or given user input. In one embodiment, the method is selected given the texture, edge, illumination, color, and motion characteristics of a scene. As an example, in a high textured region a "softer" de-blocking method and parameters can be signaled, while in a low textured region a different, more aggressive de-blocker and parameters can be signaled instead. Similarly, in a region characterized by vertical edges an interpolation method that is more biased towards the vertical direction could be signaled, while in a region with diagonal edges, an interpolation method biased diagonally can be used instead.

In a different example, for a scene with low motion, a motion compensated method could be signaled for temporal interpolation, while for high motion, frame replication or frame blending can be used. This decision requires an analysis process to be performed prior to the decision. The analysis can be performed with a variety of methods, such as texture analysis (e.g. variance based or frequency analysis), using a motion estimation method including methods such as affine, parabolic, and translational (e.g. block based) motion estimation, and illumination change characterization among others.

In an alternative embodiment, the decision can be performed using a distortion and/or complexity analysis of each method. The method that results in the lowest distortion and/or complexity can be selected as the method to be signaled. In particular, in an up-conversion example such as 720p to 1080p, or horizontally sampled and Side by Side multiplexed or quincunx sampled and checkerboard multiplexed 3D video data to a full resolution stereo pair, all available up-sampling filters are tested for every region. The filter that results in an up-converted region that resembles as closely as possible to the original up-converted signal and, optionally, requires the least or a desired complexity for the conversion, is selected for signaling.

Figure 5:
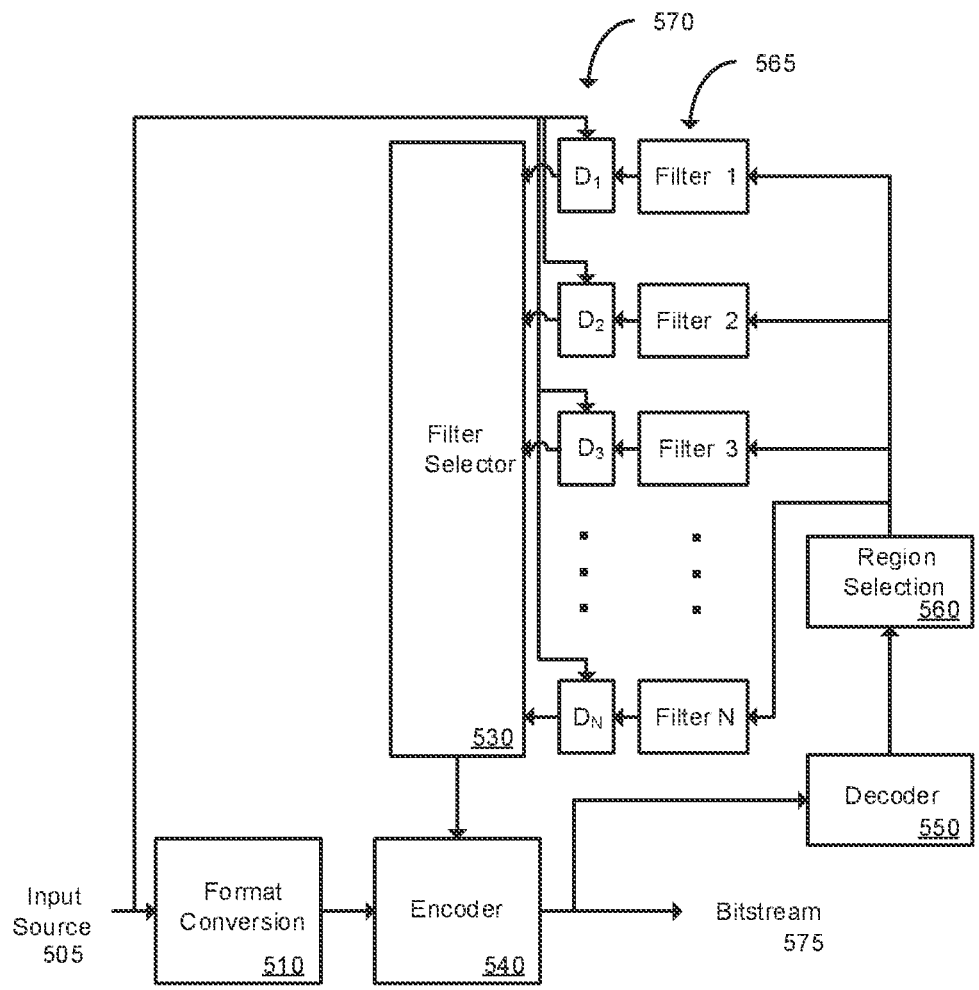
FIG. 5 is a diagram of a filter selection process based on subjective or objective distortion estimation according to an embodiment of the present invention.

The structure of a distortion/complexity based model is illustrated in FIG. 5, where an input source 505 is processed through a format conversion 510, an encoder 540, and then a decoder 550. The decoded stream is then divided into regions and each region is forwarded to a set of filters 565 (e.g., filter 1 . . . N)(Region Selection 560). The Region Selection 560 may contain one or more algorithms for regionally dividing the decoded stream including predetermined regions and/or adaptively determined regions including any based on regional brightness, contrast, edges, motion, and/or others. After filtering a distortion and/or complexity analysis is performed 570. The distortion analysis may be the same or tailored for each filter type. The filter selection mechanism 530 then evaluates the results of the distortion/complexity analysis for each region. The best match based on a distortion/complexity selection criterion is then provided to the encoder 540 for production of the output bitstream 575. The selected best match is illustrated as being placed and/or encoded into the output bitstream 575, but may be provided in other mechanisms (not shown), including side information and/or metadata related to the output bitstream 575.

The selection can be based on distortion, e.g. compared to the original, but also jointly on rate, distortion, and even complexity of the method. The rate can include the bits that may be required to signal the method and its parameters, assuming that the encoding of the method may consider compression (e.g. prediction and entropy coding). Rate may also account for the bits of the actual video signal since it might be possible to consider multiple alternative representations of the same signal which may require different number of bits.

Different methods, as specified by this invention, may be appropriate for the different representations. In this scenario an encoder may select both the best representation (given a joint rate, distortion, and complexity criterion), but also the best post-processing method jointly. Distortion may be based on one or more of a variety of metrics, such as the Sum of Absolute Differences (SAD), Sum of Square Errors (SSE), or other metrics including subjective evaluation. Distortion could also be based on measuring a variety of characteristics of the image after post-processing, including blockiness, variance, frequency characteristics, image/texture sharpness, edge quality, or through the detection and measurement of artifacts that may have been created due to the usage of a particular method etc. Such measurements can be very useful in scenarios where the original content might not be available or is available but only at a different, i.e. lower, resolution or format. As an example, consider an up-conversion of a 30p signal to a 60p signal (increase frame rate by 2×). In this scenario, detection of temporal artifacts can be very useful to determine the best method to signal for every frame or region. In one embodiment, the present invention utilizes at least one of a quantity and a quality of detected temporal artifacts caused by various methods to select which of the methods or classes of methods are signaled.

Selecting the best method could be done using a full search approach, i.e. test all available processing methods compared to the original or given the available evaluation metrics applicable to this process. However, fast methods could also be considered which can considerably reduce complexity. In particular, instead of testing all possible methods for processing a region, an analysis of a region and given its characteristics may be used to provide guidance on a selection of methods that are appropriate for testing for that region. For example, for frame rate conversion, the invention may first perform a simple motion estimation process, and given the motion information determine if it is needed or necessary to test any temporal (motion compensated), motion adaptive, or only basic methods such as frame blending or frame replication. Motion estimation could consist of a block based scheme such as the Enhanced Predictive Zonal Search (EPZS) algorithm, or could just rely on a simple frame/region difference.

Figure 11:
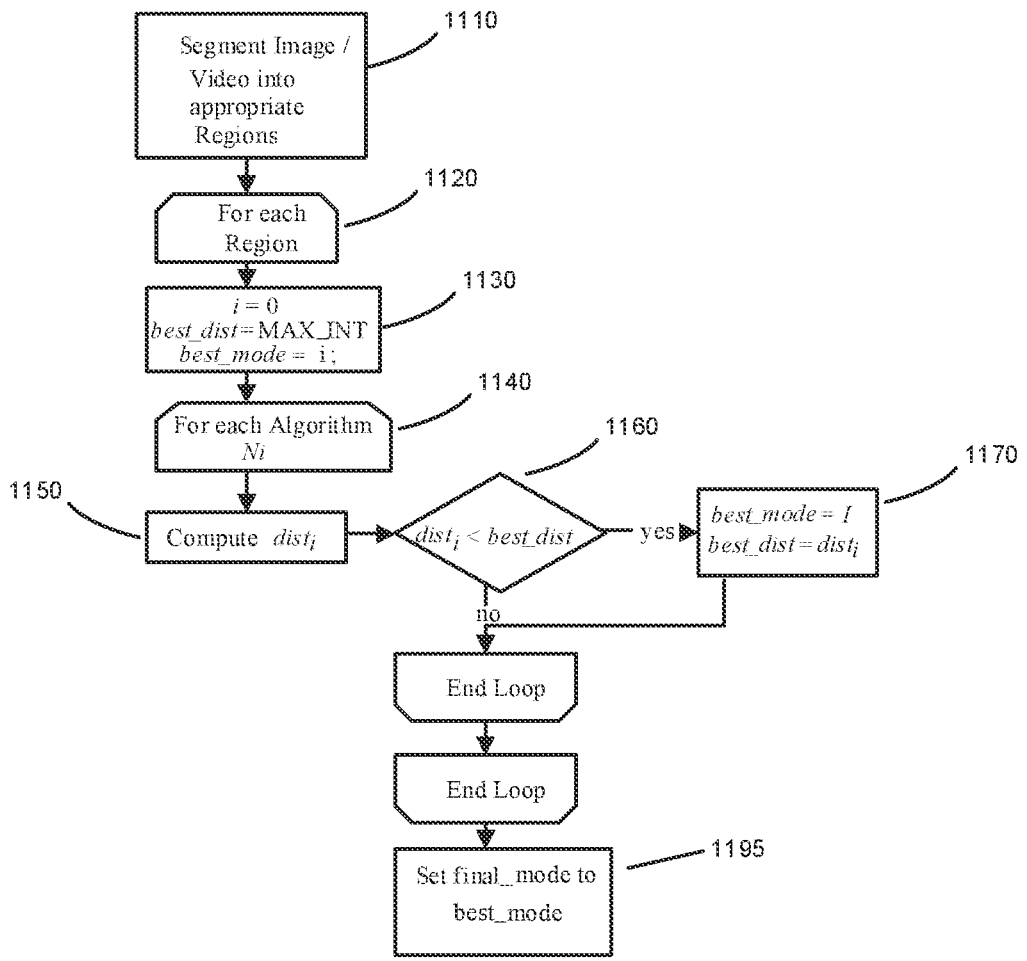
FIG. 11 is a flow chart illustrating an evaluation and selection of an image region according to an embodiment of the present invention.

FIG. 11 is a flow chart illustrating an evaluation and selection of an image region according to an embodiment of the present invention. At step 1110, an image or video is segmented into regions. The regions are predetermined or determined based on any of the techniques described herein.

A loop 1120 is set up to iteratively examine each region (1120), and parameters are initialized (step 1130). For each of a plurality of algorithms, methods, or processes, a second loop is set up (1140). For each region, each algorithm/method/process is performed to determine the best mode or result(s). In this example, a distance function (dist) is computed (step 1150) and compared to previously computed dist functions (step 1160). The best algorithm for each region may be saved and then provided for encoding or a best algorithm across all regions may be provided for encoding (e.g., steps 1170 and 1195).

The characteristics of neighboring regions, including the methods selected for these regions, if already known, could also be considered to speed up the process. If, for example, the regions on the left and above have selected method A0 then it is very likely that also this method might be appropriate for the current region. Therefore, in various embodiments, the invention includes prioritization of likely methods when testing, or the consideration and update of a distortion threshold, which can be based on the neighboring regions and can be used to test if this mode or method should also be considered for the current region. Alternatively, a pattern of shifting parameters in known regions may also be recognized and used to predict a slightly different set of parameters for a current region to be tested.

The process may also prioritize first all other similar methods to A0. Similar considerations can be made if the neighboring regions have used different processing methods. In this scenario, all methods used in the neighboring regions can be considered as being more probable than other available methods. Probability can change given also the characteristics of the region and the relationship of the characteristics of this region with its neighbors. For example, if the region is highly textured, then it is likely that it will have more correlation with neighbors, temporal or spatial, with also similar texture. The higher the similarity with the neighbors (motion, texture, color etc), the higher the probability that also the processing method that should be applied should be the same or at least similar.

Figure 3:
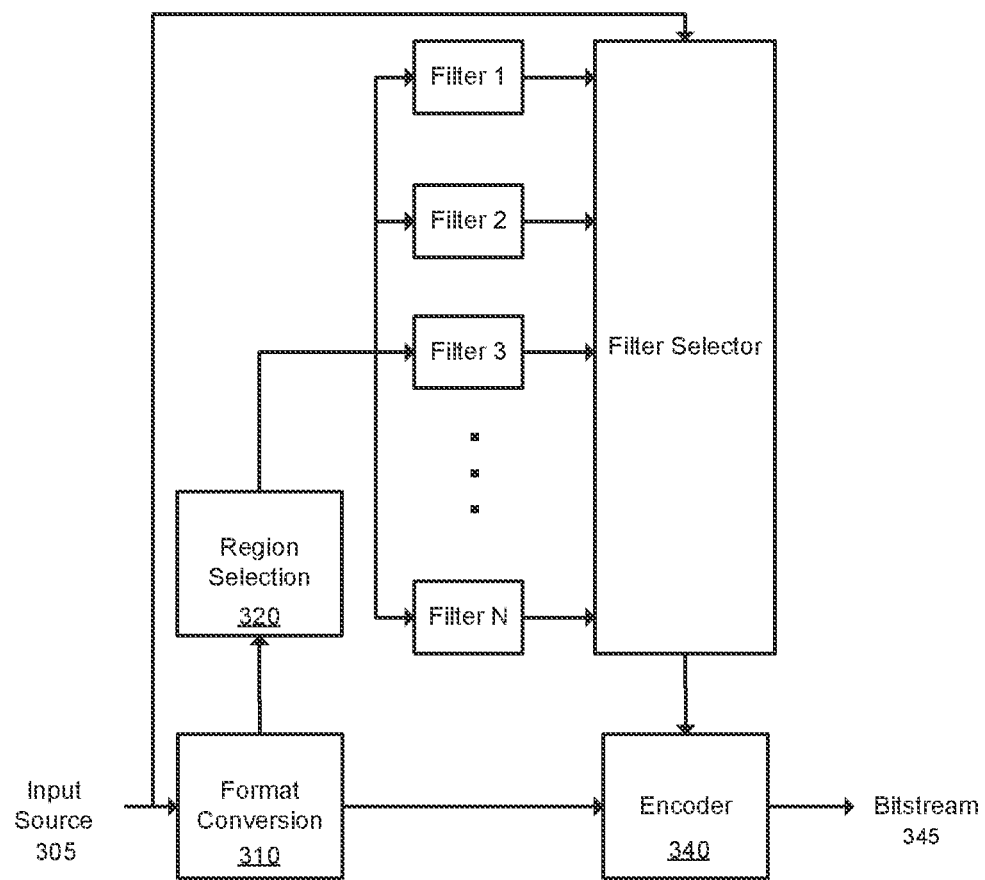
FIG. 3 is a diagram of an open loop system for embedding metadata according to an embodiment of the present invention.

In one embodiment, the method used is applied after decoding of a compressed signal, selection can be based on an open loop architecture. For example, in FIG. 3, given only the original signal and the effect each method would have on that signal. As illustrated in the FIG. 3 example, an Input Source 305 undergoes a format conversion 310. Such conversion may be for example, a horizontal or a quincunx sampling and side by side or checkerboard packing of a pair of stereographic images. The conversion is or may be regionally or otherwise segmented. A region is selected (e.g., region selection 320), and each region in turn (or in parallel) is applied to series of filters (or methods, algorithms, or processes) (e.g., filters 1 . . . N). The filter having one of the highest quality, least cost, or predetermined combination of both or other factors is then selected and provided to the encoder 340 where the selection is provided as either a signal encoded (or placed) in the output bitstream 345 or provided as side information (not shown) related to the output bitstream 345. The signal may contain, for example, the selected filter, an identifier of the filter, or an identifier of a class or category of filters that help convert the signal to its original (e.g. full resolution) or other format.

Figure 4:
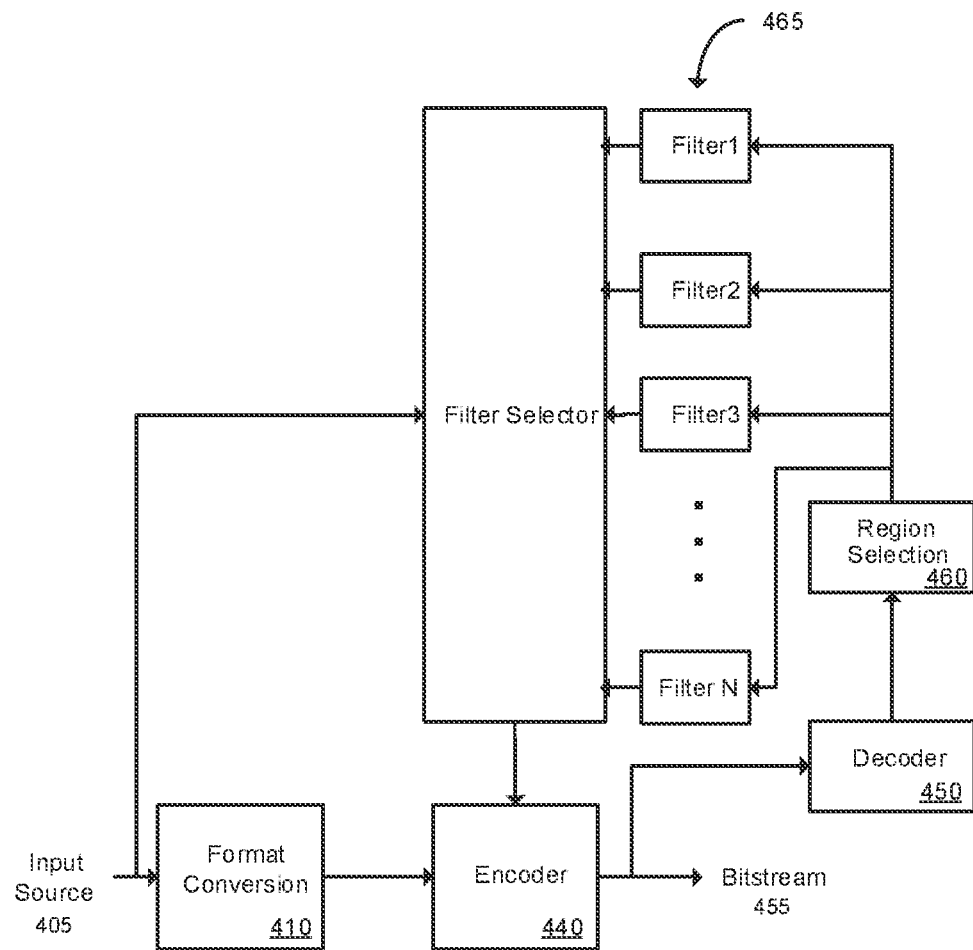
FIG. 4 is a diagram of a closed loop system for embedding metadata according to an embodiment of the present invention.

In another embodiment, selection is based on a closed loop architecture (see FIG. 4). In a closed loop architecture, selection is based on the performance of the method given the actual decoded signal, which commonly results in improved performance compared to an open loop system. As illustrated in the example of FIG. 4, an input source 405 is processed through a format conversion 410, an encoder 440, and then a decoder 450. The decoded stream is then divided into regions and each region is forwarded to a set of filters 465 (e.g., filter 1 . . . N)(Region Selection 460). The Region Selection 460, may contain one or more algorithms for regionally dividing the decoded stream including predetermined regions and/or adaptively determined regions including any based on regional brightness, contrast, edges, motion, and/or others. The filter selection mechanism then compares each region after decoding and filtering to a corresponding region in the original input. The best match based on a selection criteria is then provided to the encoder 440 for production of the output bitstream 455. The selected best match is illustrated as being placed and/or encoded into the output bitstream 455, but again, may be provided in other mechanisms such as, for example, metadata or side information (not shown) related to the output bitstream 455.

The signaling can specify specific filters or methods. It can also, however specify a class/type of filters or methods which can provide further flexibility to a decoder or post-processor. For example, instead of signaling that a separable filter with specific coefficients is used for up-conversion of the image, the system can specify that any separable filter or a separable filter of a certain length and above or below would result in acceptable performance. The decoder or post-processor is then free to select which filter to use, given complexity or availability.

If a filter is not available, then a decoder/post-processor may also have the option to select the method that is the most similar one to the method signaled (e.g. for the separable filter example, a non-separable filter of the same length), or use a previously defined "default" filter that is specified in the system. The decoder/post-processor, can also select the method or completely ignore the metadata information given other characteristics of the process or the device. In particular, given power/battery status of the device, the system may select to use a higher or a lower complexity algorithm.

In fact, the present invention may also be structured to also signal the metadata alternative modes that can be used given power, or complexity footprints of a device. For example, the present invention may include embedding a number of alternative maps in the signal (e.g., 2 or more). Each alternative map targeting a different device (e.g. one map for a high definition LCD TV, another for a Plasma, another for a PC, an iPod or iPhone etc), and battery status. The device can detect its corresponding map, i.e. using a signature in the metadata that specifies the device, and perform its corresponding and optimized processing. It is apparent that for the encoding system, all devices need to be considered during the optimization and method selection process.

Figure 6:
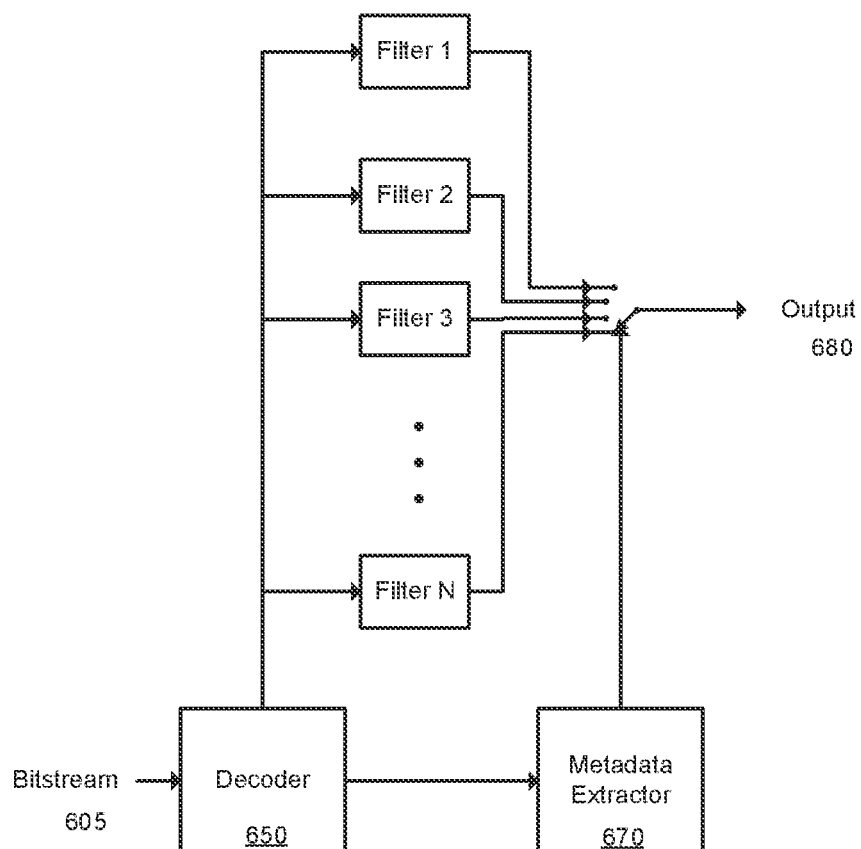
FIG. 6 is a diagram of metadata based post-processor according to an embodiment of the present invention.

FIG. 6 is a diagram of metadata based post-processor according to an embodiment of the present invention. In this example, an encoded bitstream 605 is decoded (decoder 650) and provided to a series of filters each of which process the decoded signal. A metadata extractor 670 identifies a previously selected filter to be utilized for the current portion of the decoded bitstream being filtered and selects the output of the filtering processes from the appropriate filter. In other embodiments, the metadata extractor 670 may be replaced with, for example, a side information reader which provides similar information from a side information data stream related to the input bitstream 605. The appropriate filter is the filter identified by the metadata/side information, or, for example, a filter closest to the characteristics of the previously selected filter. The selected filter output then provides the output decoded and filtered bitstream 680.

Figure 7:
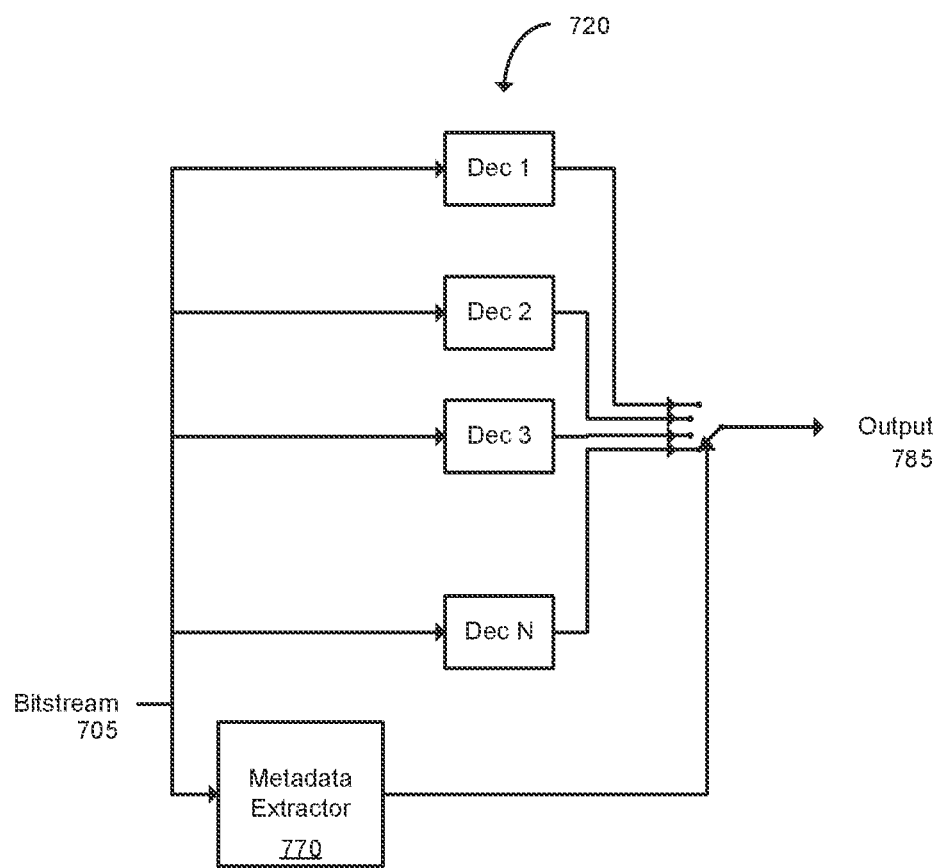
FIG. 7 is a diagram of a metadata based adaptive decoding that may be used for, for example, error concealment or decoder simplification, according to an embodiment of the present invention.

FIG. 7 is a diagram of a metadata based adaptive decoding that may be used for, for example, error concealment or decoder simplification, according to an embodiment of the present invention. An input bitstream 705 is provided to a series of decoding mechanisms 720 (e.g., decoders 1 . . . N) and a metadata extractor 770. The metadata extractor 770 extracts a signal identifying the previously selected or preferred decoder, which is used to select an appropriate output from the series of decoding mechanisms 720. The previously selected decoder may be a specific decoder or a type of decoder, and the decoder output ultimately selected for the output bitstream 785 may be the decoder previously selected, a decoder of a same class or type, an equivalent decoder, a generic decoder, or a decoder optimized with parameters selected to alter performance of the decoder to more closely match the previously selected decoder, or others.

It may be desirable, for some applications, to retain or alter the metadata information after processing, re-encoding, and trans-coding of the image data. In particular, if the content is rescaled and then re-encoded, the metadata could be retained as is, or adjusted given the scaling applied but also the characteristics of the encoding (e.g. quantization parameters and performance of motion estimation and compensation) and artifacts introduced by this process. This can reduce the complexity of reevaluating the performance of the available processing methods. The characteristics of the recommended methods for post-processing in the original signal can also provide hints in the secondary encoding on whether any additional but also which type of post-processing may be applied at a subsequent decoder.

Figure 8:
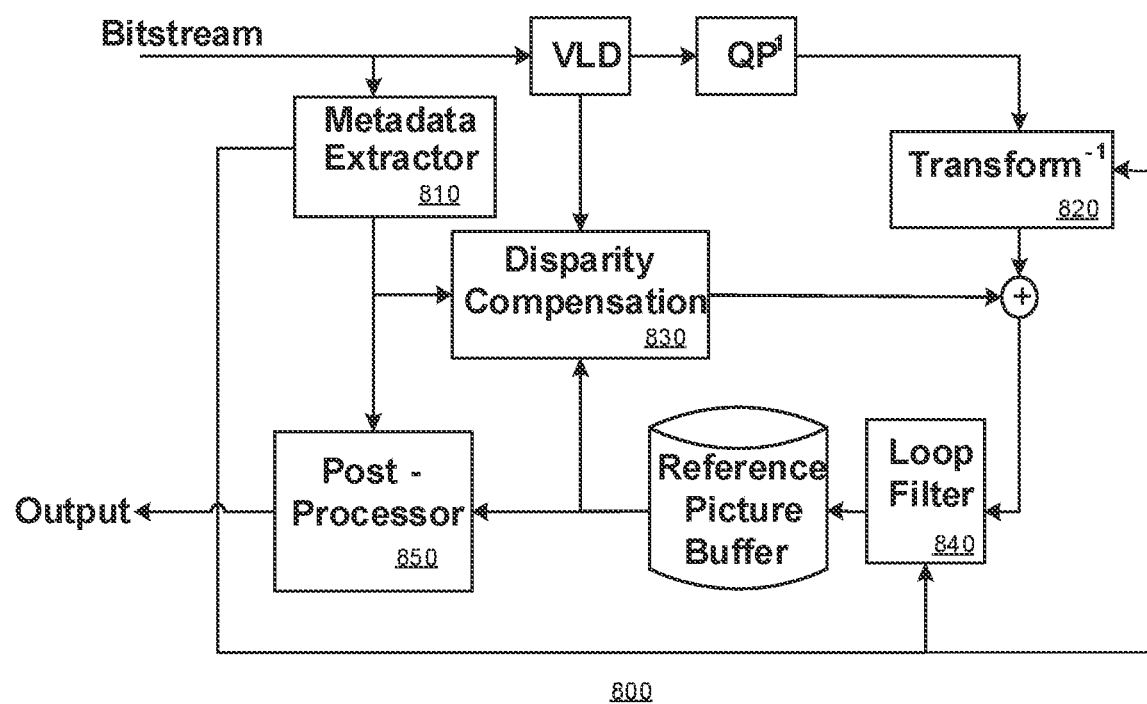
FIG. 8 is a diagram of a decoder according to an embodiment of the present invention.
Figure 9:
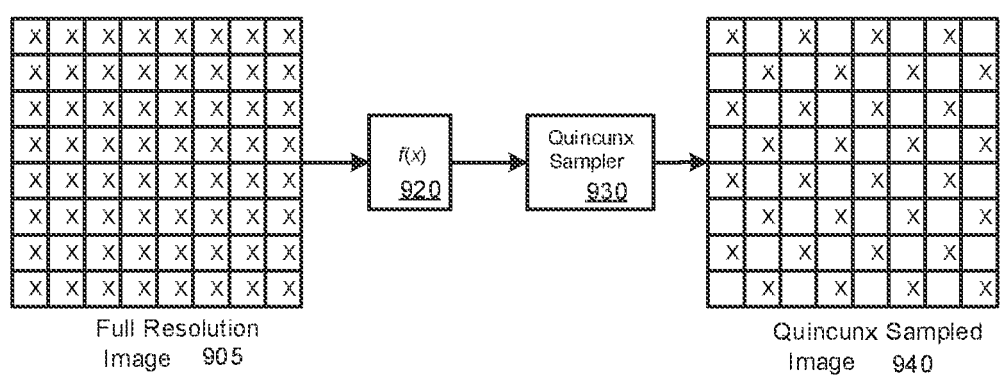
FIG. 9 is an illustration of a quincunx sampling technique.
Figure 10:
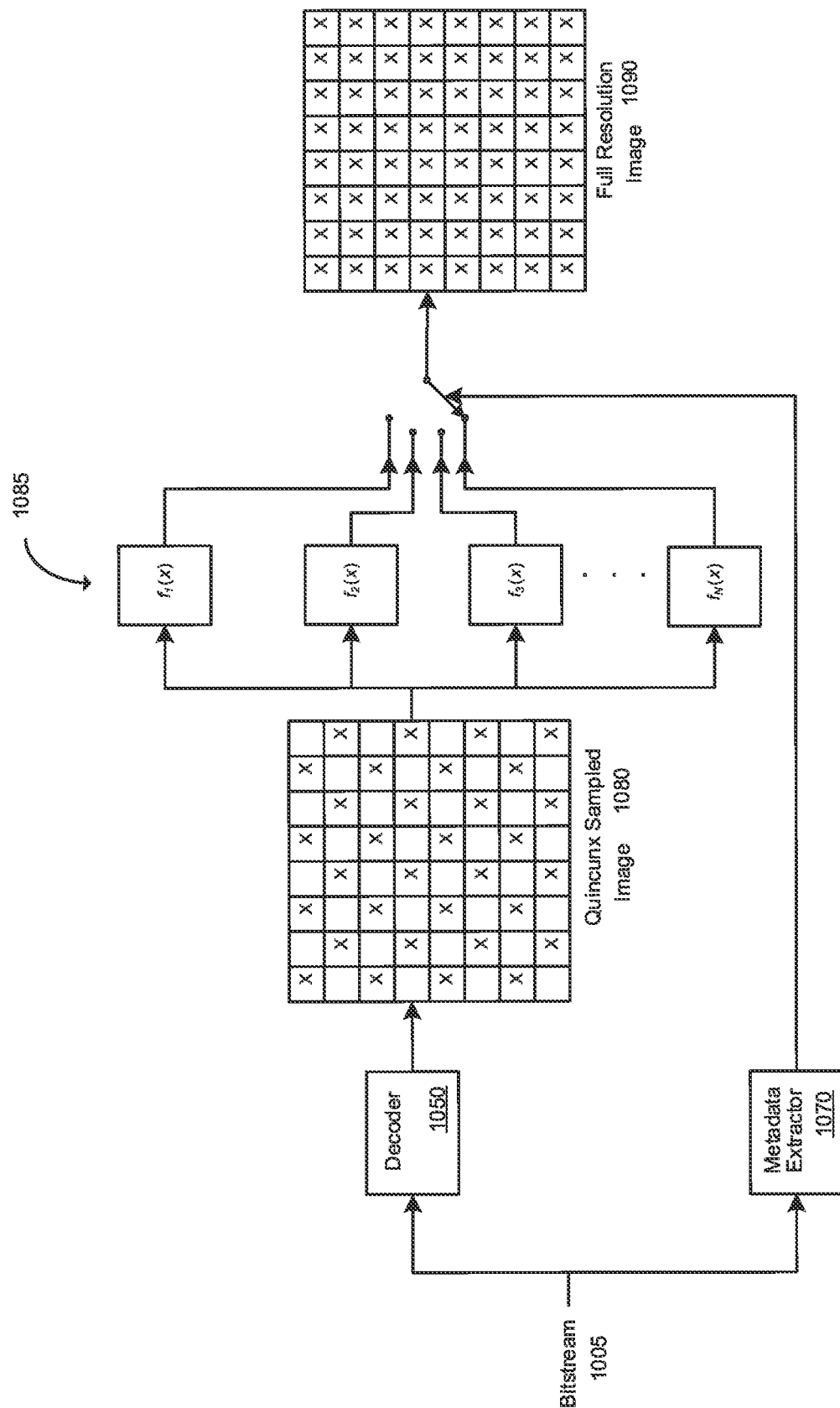
FIG. 10 is an illustration of an interpolator for quincunx sampled data according to an embodiment of the present invention.

FIG. 8 is a diagram of an exemplary decoder 800 according to an embodiment of the present invention. The decoder 800 utilizes metadata "hints." The decoder 800 includes a Metadata extractor 810 that extracts metadata that is utilized in a plurality of processes within the decoder, such as, for example, a decoding process (e.g., an inverse transform operation 820), a loop filter 840, a disparity compensator (providing disparity compensation) 830, and/or a post-processor 850 among others. The metadata provides one or more of a selection, data, and/or parameters for use in the decoder 800, loop filter 840, disparity compensator 830, and/or post processor 850. The meta data drives the above processes, for example, to reduce complexity if these are considered safe to do so (e.g., such that they would produce minimal drift and/or quality impact). Metadata similarly encoded in the bitstream (or provided in side information) may be utilized for any other process or sub-process within the decoder or other outside functions.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a decoder, any other equivalent device, or device having a decoder therein, such as a media player (e.g., DVD, Blu-ray, iPod, computer, etc), tuner (e.g., PAL, ATSC, etc), set-top box, display or television, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to devices and processors (e.g., post-processors), conversion methods, up-conversion methods, processing, algorithms, selection mechanisms, artifact identification, etc., should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blu-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, analysis of methods, signaling of methods, classes of methods, categories of methods, preparation and transmission of signals, selection of signals at a decoder or post-processor, implementing algorithms identified in signals that perform at least part of a post-process or decoding operation, and the display, storage, or communication of results according to the processes of the present invention (which may include, for example, delivery of post-processed video signals to a display).

Various embodiments of the present invention may relate to one or more of the Enumerated Example Embodiments (EEEs) below, each of which are examples, and, as with any other related discussion provided above, should not be construed as limiting any claim or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.). Examples:

Enumerated Example Embodiment 1 (EEE1). A method comprising the step of receiving a signal indicative of a processing technique to be utilized on a data stream.

EEE2. The method according to EEE1, wherein the processing technique comprises at least one of resolution conversion, controlling a complexity of processing, artifact reduction, error correction, error concealment, scaling, interpolation, an alteration of existing processing tools, and an enabling or disabling of at least one tool.

EEE3. The method according to EEE2, wherein the resolution conversion comprises at least one of spatial resolution conversion and temporal resolution conversion.

EEE4. The method according to EEE2, wherein scaling comprises at least one of de-interlacing, temporal interpolation, and spatial interpolation.

EEE5. The method according to EEE2, wherein error concealment comprises a prediction of motion of a region in error.

EEE6. The method according to EEE1, wherein the signal is further indicative of at least one of a spatial and temporal extent to which the processing technique is to be applied.

EEE7. The method according to EEE6, wherein the data stream is a video data stream and the extent comprises whether the processing technique is applied to at least one of all of the video, portions of the video, pictures of the video, and regions within the video.

EEE8. The method according to EEE7, wherein pictures of the video comprise any of a frame of the video and a field of the video.

EEE9. The method according to EEE1, wherein the data stream comprises a video comprising at least two different views and the signal further indicates that the processing technique is performed for at least one region within at least one frame of the video.

EEE10. The method according to EEE9, wherein the different views comprise at least one of stereographic views, two different images, a 2D image and depth information, multiple views of 2D scene, and multiple views of a 3D scene.

EEE11. The method according to EEE9, wherein the at least two different views are compressed and multiplexed within the data stream in a standardized motion picture format capable of single view video streams.

EEE12. The method according to EEE9, wherein compression of the views comprises at least one of a sampling, filtering, and decimation of the views.

EEE13. The method according to EEE9, wherein compression of the views comprises at least one of horizontal, vertical filtering, and quincunx sampling.

EEE14. The method according to EEE9, wherein compression of the views comprises both filtering and sampling.

EEE15. The method according to EEE14, wherein the sampling comprises at least one of horizontal, vertical, quincunx, formula based, pattern based, and arbitrary sampling.

EEE16. The method according to EEE14, wherein the multiplexing is done in at least one of a checkerboard format, a quadrant based format, a column format, a row format, a side-by-side format, an over-under format, a format based on a pattern, and an alternative format.

EEE17. The method according to EEE1, wherein the signal identifies at least one of at least part of a decoding process and at least part of a post-decoding process to be applied to a region of an image or video scene having characteristics on which the identified process operates efficiently.

EEE18. The method according to EEE17, wherein the characteristics comprise at least one of texture, contour, edge, contrast, dynamic range, and brightness of the region.

EEE19. The method according to EEE1, wherein the signal is received from at least one of the data stream and side information related to the data stream.

EEE20. The method according to EEE1, wherein the signaling comprises a processing technique to be applied to at least one of a sequence, group of pictures (GOP), and region of one of a fixed, arbitrary, or varying size.

EEE21. The method according to EEE20, wherein the method further comprises the step of selecting at least one processing technique based on the signaled processing technique and applying the selected processing technique to at least one of the sequence, GOP, and region.

EEE22. The method according to EEE21, wherein the step of selecting is performed by a decoder configured to decode the data stream by applying the selected processing technique to at least one of the sequence, group of pictures (GOP), and region.

EEE23. The method according to EEE21, wherein the step of selecting comprises selecting a processing technique in a different category of processing techniques than the signaled processing technique but nearest the signaled processing technique.

EEE24. The method according to EEE1, wherein the processing technique comprises a series of processing techniques.

EEE25. The method according to EEE24, wherein the series of processing techniques comprises at least one of an interpolation process, filtering, and a de-blocking process.

EEE26. The method according to EEE1, wherein the signaling comprises signaling a family of processing techniques, and the method further comprises the steps of selecting at least one processing technique from the signaled family and applying the selected technique(s) to at least one of a sequence, group of pictures (GOP), and a region of one of a fixed, arbitrary, or varying size.

EEE27. The method according to EEE1, wherein the processing technique was selected via a pre-processing prior to receiving the data stream.

EEE28. The method according to EEE27, wherein the pre-processing comprises studio work performed prior to mastering the data stream for media storage or broadcast.

EEE29. The method according to EEE27, wherein the processing technique is performed on-the-fly from a playback of the data stream.

EEE30. The method according to EEE27, wherein the pre-processing comprises an iterative performance of a set of potential processing techniques on a like data stream and an embedding of an identifier of a selected processing technique in at least one of the data stream and side information related to the data stream.

EEE31. The method according to EEE27, wherein the pre-processing is performed on-the-fly during a playback of a video captured by the data stream.

EEE32. The method according to EEE27, wherein the selected processing technique comprises at least one of a least cost processing technique, a highest performance processing technique, and a combination or tradeoff between cost and performance.

EEE33. The method according to EEE32, wherein cost comprises at least one of complexity, area, power, and price.

EEE34. The method according to EEE32, wherein performance comprises at least one of quality and speed.

EEE35. The method according to EEE1, wherein the data stream comprises an encoded video data stream and the signaled processing technique was selected to enhance one of a decoding and a post-process of decoding for at least one of a picture, Group Of Pictures (GOP), and region of the video data stream.

EEE36. The method according to EEE35, wherein the processing technique was selected at least one of before, during, or after an encoding of the video data stream.

EEE37. The method according to EEE35, wherein the data stream comprises a trans-coded encoded video stream.

EEE38. The method according to EEE37, wherein the processing technique was selected at least one of before, during, or after a transcoding of the video data stream.

EEE39. The method according to EEE35, wherein the processing technique comprises parameters to be used in conjunction with the processing technique on a region of the video data stream, and the method further comprises receiving a change in parameters for at least one of sub-regions of the region and a different region.

EEE40. A method, comprising the steps of:
selecting a mechanism for improving at least a portion of a video to be decoded from an encoded video wherein the selected mechanism is configured to direct at least one of a decoding of the encoded video and a post-process applied to the video after decoding; and
packaging at least one of the selected mechanism and an identifier of the selected mechanism as a directive signal into at least one of the encoded video and side information of the encoded video.

EEE41. The method according to EEE40, wherein the selected mechanism comprises at least one of a process and parameters of a process.

EEE42. The method according to EEE40, wherein the portion of the video comprises at least one of a region and sub-region of the video.

EEE43. The method according to EEE40, wherein the portion of the video comprises at least one of an image of the video, a sequence of images of the video, a region of an image of the video, a dynamic region across frames of the video, and any sub-region(s) of the video.

EEE44. The method according to EEE40, wherein the portion of the video comprises a region or sub-region of the video comprising a block.

EEE45. The method according to EEE40, wherein the portion of the video comprises a region or sub-region of the video comprising multiple blocks.

EEE46. The method according to EEE45, wherein the blocks are non-contiguous.

EEE47. The method according to EEE45, wherein the blocks are comprised at least part of a checkerboard pattern.

EEE48. The method according to EEE40, wherein the portion of the video comprises a geometric arrangement of video data samples across multiple frames of the video.

EEE49. The method according to EEE48, wherein the geometric arrangement varies in at least one of size and shape between frames of the video.

EEE50. The method according to EEE40, wherein the portion of the video comprises an irregular arrangement of video data samples.

EEE51. The method according to EEE40, wherein the portion of the video comprises co-located samples of a stereoscopic scene of the video.

EEE52. The method according to EEE40, wherein the portion of the video comprises a cuboid comprising M×K×N where M is width, K is height, and N is a number of temporal samples.

EEE53. The method according to EEE40, wherein the portion of the video comprises one of a segment and an object tracked across multiple frames.

EEE54. The method according to EEE40, wherein the portion of the video is determined by at least one of user input, segmentation, object tracking, scene cut detection, edge detection, watershed, haursdorff method, K-means, motion detection, motion estimation, motion analysis, and quality evaluation.

EEE55. The method according to EEE40, further comprising the step of repeating the steps of selecting and packaging for a $2^{nd}$ portion of the video.

EEE56. The method according to EEE55, wherein the portion of the video comprises a regularly shaped region and the $2^{nd}$ portion of the video comprises an irregularly shaped region.

EEE57. The method according to EEE55, wherein the portion of the video and the 2 nd portion of the video overlap.

EEE58. The method according to EEE57, wherein the selected mechanism comprises an instruction of how to average processing performed by the mechanisms in the video overlap.

EEE59. The method according to EEE57, wherein the selected mechanism comprises an instruction of how to sequentially initiate the mechanisms in the video overlap.

EEE60. The method according to EEE57, wherein the portions of the video are predefined and the packaging contains no information identifying the portions.

EEE61. The method according to EEE57, wherein the portions of the video are defined using at least one of a cuboid description, a vector based description, and a raster based description.

EEE62. The method according to EEE40, wherein the portion of the video is identified with data encoded using an image format.

EEE63. The method according to EEE40, wherein the portion of the video is identified with data encoded using a format comprising at least one of CGM, SVG, EPS, WMF, TIFF, BMP, JPEG, JPEG-2000, MPEG-2, and H.264, and MPEG4-AVC.

EEE64. The method according to EEE40, wherein the portion of the video comprises a region identified in a process map.

EEE65. The method according to EEE40, wherein the portion of the video comprises a region mapped in at least one of an image or graphics format.

EEE66. The method according to EEE40, further comprising the step of packaging sequence instructions along with the directive signal.

EEE67. The method according to EEE40, wherein the directive signal comprises sequencing that indicates a preferred order of various processes to be performed.

EEE68. The method according to EEE40, wherein the directive signal comprises a sequencing of spatial up-sampling, temporal up-sampling, and de-blocking to be performed at least in part by the selected mechanism.

EEE69. The method according to EEE40, wherein the portion of the video comprises a region divided into a series of sub-regions wherein the selected mechanism comprises a $1^{st}$ parameter corresponding to a first of the sub-regions and a $2^{nd}$ parameter corresponding to a second of the sub-regions.

EEE70. The method according to EEE40, wherein the mechanism is selected based at least in part on a complexity of the mechanism.

EEE71. The method according to EEE40, wherein selected mechanism has a lowest complexity for a given quality threshold.

EEE72. The method according to EEE40, wherein:
said method is embodied in a set of instructions stored on an electronically readable media;
said instructions, when loaded into a processing device, cause the processing device to perform the steps of said method.

EEE73. The method according to EEE72, wherein said instructions are compiled computer instructions stored as an executable program on said electronically readable media.

EEE74. The method according to EEE40, wherein said method is embodied in a set of electronically readable instructions stored in an electronic signal.

EEE75. A post-processing device, comprising:
a video input configured to receive a decoded video stream;
an instruction mechanism configured to one of accept a directive instruction from a side information channel of the video stream and identify a directive instruction from the decoded video stream;
a post-processor configured to post-process the decoded video stream based on the directive instruction; and
a video output configured to output the post-processed video stream.

EEE76. The post-processing device according to EEE75, wherein the post-processing device is integrated into at least one of a display, a set-top box, and a media player.

EEE77. The post-processing device according to EEE75, wherein the directive instruction comprises an identification of at least one region in the video and at least one processing method to be applied to the region.

EEE78. The post-processing device according to EEE77, wherein the region comprises sub-regions and the directive instruction comprises different parameters to be applied to the processing method for processing each sub-region.

EEE79. The post-processing device according to EEE77, wherein the directive signal identifies regions of different texture qualities and processing methods specifically for each texture quality.

EEE80. The post-processing device according to EEE75, wherein the directive signal comprises a filter identification selected after testing a plurality of filters on the decoded video stream.

EEE81. The post-processing device according to EEE80, wherein the filter identification comprises an identification of an entire category of filters.

EEE82. The post-processing device according to EEE81, wherein the post-processor is further configured to select a filter from the category of filters and utilize the selected filter to post-process the decoded video stream.

EEE83. The post-processing device according to EEE82, wherein the post-processor is further configured to select a filter having properties closest to properties of the category of filters and utilize the selected filter as at least part of the post-process.

EEE84. The post-processing device according to EEE80, wherein the post-processor is further configured to select a filter known to have properties that are at least one of close to or better than the filter identified by the filter identification.

EEE85. The post-processing device according to EEE80, wherein the filter identification is selected based on at least one of distortion and complexity.

EEE86. The method according to EEE84, wherein distortion is evaluated via at least one of SAD, SSE, subjective evaluation, blockiness, variance, frequency characteristics, image/texture sharpness, edge quality, and artifacts either spatially or temporally.

EEE87. The post-processing device according to EEE80, wherein the testing is performed in an open-loop type testing device.

EEE88. The post-processing device according to EEE80, wherein the testing is performed in an closed-loop type testing device.

EEE89. The post-processing device according to EEE80, wherein the testing is performed for a plurality of regions of the video.

EEE90. The post-processing device according to EEE89, wherein the plurality of regions comprise temporal regions of the video.

EEE91. The post-processing device according to EEE90, wherein the plurality of temporal regions comprise regions of changing shape and size.

EEE92. The method according to EEE89, wherein the regions of the video are determined by at least one of segmentation, object tracking, scene cut detection, edge detection, watershed, haursdorff method, K-means, motion detection, motion estimation, and motion analysis.

EEE93. The method according to EEE75, wherein the regions of the video are identified using at least one of CGM, SVG, EPS, WMF, TIFF, BMP, JPEG, JPEG-2000, MPEG-2, and H.264, and MPEG4-AVC.

EEE94. A system, comprising:
an encoder configured to select at least one of a processing technique, a category of processing techniques, and a series of processing techniques to be utilized in decoder and encode the selected techniques or an identifier of the selected technique(s) in at least one of an encoded video stream and side information related to the encoded video stream; and
a decoder configured to receive the encoded video stream and decode the video stream using at least one of the selected technique(s).

EEE95. The system according to EEE94, wherein the selected technique(s) are solely identified from the encoded video stream.

EEE96. The system according to EEE94, wherein the selected technique(s) are identified by the decoder from at least one of the related side information and the encoded video stream.

EEE97. The system according to EEE94, wherein the techniques are selected based on at least one of quality, complexity, and cost.

EEE98. The system according to EEE94, wherein the decoder uses the selected processing technique to select another processing technique.

EEE99. The system according to EEE94, wherein the decoder maintains an inventory of processing techniques and selects a processing technique or technique(s) from the inventory most closely matching the technique(s) selected by the encoder.

EEE100. The system according to EEE98, wherein the decoder selected technique is selected based at least one of complexity, cost, and quality.

EEE101. The system according to EEE98, wherein the decoder selected technique is selected based at least in part on complexity in light of an amount of processing power available in the decoder.

EEE102. A decoder configured to decode an encoded video steam using one of a decoding process and a post-process identified in the video stream or via side information related to the video stream, wherein the decoder is configured to perform an additional analysis of at least one of the video stream and the decoded video stream utilized to provide an assist to the decoding process or post-process.

EEE103. The decoder according to EEE102, wherein the additional analysis utilizes information encoded in the encoded video stream or side information.

EEE104. The decoder according to EEE102, wherein the additional analysis is directed at least in part by information encoded in the encoded video stream or side information.

EEE105. The decoder according to EEE102, wherein the additional analysis comprises a refinement of information encoded in the video stream or provided in side information.

EEE106. The decoder according to EEE105, wherein the refinement comprises a lower cost.

EEE107. The post-processing device according to EEE75, further comprising a post-process analyzer configured to analyze at least one of the decoded video stream and the video stream prior to decoding, and, based on the analysis, direct at least part of at least one of a decoding process and the post processor.

EEE108. The post-processing device according to EEE107, wherein the analyzer is directed based on information contained in the video stream or in side information related to the video stream.

EEE109. The method according to EEE40, further comprising the step of packaging a directive instruction for an additional analysis to be performed by at least one of the decoder and a post-processor during decoding and/or post processing of the video data after decoding.

EEE110. A method comprising the steps of:
receiving a signal indicative of a processing technique to be utilized on an encoded video data stream comprising downsampled multiplexed views; and
performing at least one of a decoding and a post-processing of the encoded video stream consistent with the received signal; and
performing a further analysis of at one of the encoded video stream and decoded/post-processed video stream and, based on the analysis, performing at least one of improving the decoding, improving the post-process, and performing a second post-process.

EEE111. The method according to EEE110, further comprising any of the steps described in EEEs 2-39.

EEE112. The method according to EEE110, wherein the step of performing a further analysis comprises a refinement of the indicated processing technique.

EEE113. The method according to EEE112, wherein the method is performed by at least one of a media player, a set-top box, a converter box, and a display device.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A method for decoding a video bitstream, the method comprising:
receiving, at a decoder, the video bitstream comprising at least one region comprising two images;
receiving first metadata in the video bitstream identifying a first post-decoding process to be applied to the at least one region;
receiving second metadata in the video bitstream identifying second post-decoding process to be applied to the at least one region;
selecting, by the decoder, one of the first metadata or the second metadata; and
applying the one of the first post-decoding process or the second post-decoding process identified by the selected metadata to the at least one region without applying the other of the first metadata or the second metadata to the at least one region,
wherein the video bitstream further comprises a second region different from the at least one region, and
wherein the one of the first post-decoding process or the second post-decoding process identified by the selected metadata is not applied to the second region.

2. The method of claim 1, wherein the second post-decoding process is related to de-blocking.

3. The method of claim 1, wherein the second post-decoding process maps the at least one region to a target device.

4. The method of claim 1, wherein the second post-decoding process was selected during studio work prior to mastering the video bitstream.

5. The method of claim 1, wherein the first post-decoding process is at least one of de-interleaving and upsampling.

* * * * *